US012602086B2

(12) United States Patent
Kim et al.

(10) Patent No.: US 12,602,086 B2
(45) Date of Patent: Apr. 14, 2026

(54) ELECTRONIC DEVICE AND METHOD FOR MANUFACTURING THE SAME

(71) Applicant: Samsung Display Co., Ltd., Yongin-si (KR)

(72) Inventors: Kyung-Man Kim, Yongin-si (KR); Sunghoon Kim, Yongin-si (KR); Sanghoon Kim, Yongin-si (KR); Min-Hoon Choi, Yongin-si (KR); Seongjin Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 255 days.

(21) Appl. No.: 18/460,023

(22) Filed: Sep. 1, 2023

(65) Prior Publication Data

US 2024/0077912 A1      Mar. 7, 2024

(30) Foreign Application Priority Data

Sep. 5, 2022      (KR) ......................... 10-2022-0112408

(51) Int. Cl.
*G06F 1/16*      (2006.01)
*H04M 1/02*      (2006.01)

(52) U.S. Cl.
CPC ........ *G06F 1/1656* (2013.01); *H04M 1/0266* (2013.01)

(58) Field of Classification Search
CPC .... G06F 1/1656; G06F 1/1626; G06F 1/1637;
G06F 1/1684; G06F 1/1686; G06F 1/1688; H04M 1/0266; H04M 1/0269; H04M 1/0283; C03C 15/00; C03C 23/0025
USPC .......................................................... 216/67
See application file for complete search history.

(56) References Cited

U.S. PATENT DOCUMENTS

| | | | |
|---|---|---|---|
| 10,252,935 B2 | 4/2019 | Murata et al. | |
| 10,584,053 B2 | 3/2020 | Ono | |
| 2018/0037489 A1* | 2/2018 | Ono | C03B 17/064 |
| 2022/0005914 A1* | 1/2022 | Lee | H10K 71/00 |
| 2022/0348492 A1* | 11/2022 | Kim | B23K 26/0608 |
| 2023/0095132 A1* | 3/2023 | Isobe | C03C 23/002 428/131 |

FOREIGN PATENT DOCUMENTS

| | | |
|---|---|---|
| JP | 2018-024571 A | 2/2018 |
| JP | 6288499 B2 | 3/2018 |

* cited by examiner

*Primary Examiner* — Duy Vu N Deo
(74) *Attorney, Agent, or Firm* — Womble Bond Dickinson (US) LLP

(57) ABSTRACT

An electronic device and a method for manufacturing the same are provided. An electronic device includes a window including a first region parallel to a flat surface that is defined by a first direction and a second direction crossing the first direction and a second region extending from the first region and including a curved surface, a display module under the window, and an electronic module under the window and overlapping the second region, and the second region includes an edge of the window, and at least one hole is defined in the second region.

6 Claims, 16 Drawing Sheets

ELECTRONIC DEVICE AND METHOD FOR MANUFACTURING THE SAME

CROSS-REFERENCE TO RELATED APPLICATION

This application claims priority to and the benefit of Korean Patent Application No. 10-2022-0112408, filed on Sep. 5, 2022 in the Korean Intellectual Property Office, the entire content of which is hereby incorporated by reference.

BACKGROUND

1. Field

Aspects of embodiments of the present disclosure relate to an electronic device and a method for manufacturing the same.

2. Description of the Related Art

To provide image information, various types of electronic devices, such as mobile phones, tablets, navigation systems, and game consoles, are used. An electronic device includes a display module for displaying an image and functional elements for providing various functions to a user. The display module may include a liquid crystal display panel or an organic light-emitting display panel, for example. The functional elements may include a speaker, a sensor, and the like.

The electronic device includes a window for protecting the display module. A user may view an image displayed by the display module through the window. Recently, electronic apparatuses with an improved display quality while providing an aesthetic appearance have been developed in response to various user needs.

SUMMARY

According to an aspect of embodiments of the present disclosure, an electronic device with improved aesthetics and display quality and a method for manufacturing the same are provided.

According to one or more embodiments of the present invention, an electronic device includes a window, a display module, and an electronic module. The window may include a first region parallel to a flat surface defined by a first direction and a second direction crossing the first direction and a second region extending from the first region and including a curved surface. The display module may be disposed under the window. The electronic module may be disposed under the window and may overlap the second region. The second region may include an edge of the window, and at least one hole may be defined in the second region.

In an embodiment, the window may include glass.

In an embodiment, the window may include an upper surface, a lower surface facing the upper surface, and a side surface connecting the upper surface and the lower surface, and the upper surface may include the flat surface and a curved surface extending from the flat surface and connected to the side surface, and the side surface may correspond to the edge.

In an embodiment, the at least one hole may be provided as a plurality of holes in the window, and the holes may be arranged side by side in a direction close to the edge and a curved surface area may increase as the hole is close to the edge. A hole of the at least one hole may include a through-hole and a cavity penetrating a portion of the window. The window may include an upper surface and a lower surface facing the upper surface, and the upper surface may include the flat surface corresponding to the first region and the curved surface corresponding to the second region, and the cavity may include a first cavity extending from the upper surface or a second cavity extending from the lower surface. A distance between the first cavity and the lower surface and a distance between the second cavity and the upper surface are each about 20 μm to about 30 μm.

In an embodiment, a hole of the at least one hole has a depth of about 1 mm or less, and on a plane, the hole has a diameter of tens of micrometers (μm) to hundreds of micrometers (μm).

In an embodiment, the display module may include at least one through-hole corresponding to the at least one hole. In an embodiment, a hole of the at least one hole may include a through-hole penetrating the window, and, on a plane, a diameter of the through-hole may increase from a center of the through-hole toward a normal line direction of the window. In an embodiment, a difference between a width of a central portion of the through-hole and a width of an end-most portion of the through-hole may be about 1 μm to tens of micrometers (μm).

According to one or more embodiments of the present invention, a method for manufacturing an electronic device includes providing a glass substrate, modifying the glass substrate, etching, and attaching a display module. In the providing of the glass substrate, provided is a glass substrate including a first region and a second region disposed outside the first region and including an edge of the glass substrate, and the glass substrate may be modified by irradiating a partial region of the second region with a beam. In the etching, the modified region of the glass substrate may be etched to provide a curved surface and a hole therein. In the attaching of a display module, a display module may be attached to the glass substrate. In the modifying of the glass substrate, the partial region may include a curved surface region in which the curved surface is to be formed and a hole region in which the hole is to be formed, and in the curved surface region, a depth of a region modified by the beam may increase toward the edge of the glass substrate, and in the hole region, a depth of a region modified by the beam is greater than that of the curved surface region.

BRIEF DESCRIPTION OF THE DRAWINGS

The accompanying drawings are included to provide a further understanding of the inventive concept, and are incorporated in and constitute a part of this specification. The drawings illustrate some example embodiments of the inventive concept and, together with the description, serve to explain principles of the inventive concept. In the drawings.

DETAILED DESCRIPTION

Figure 1A:
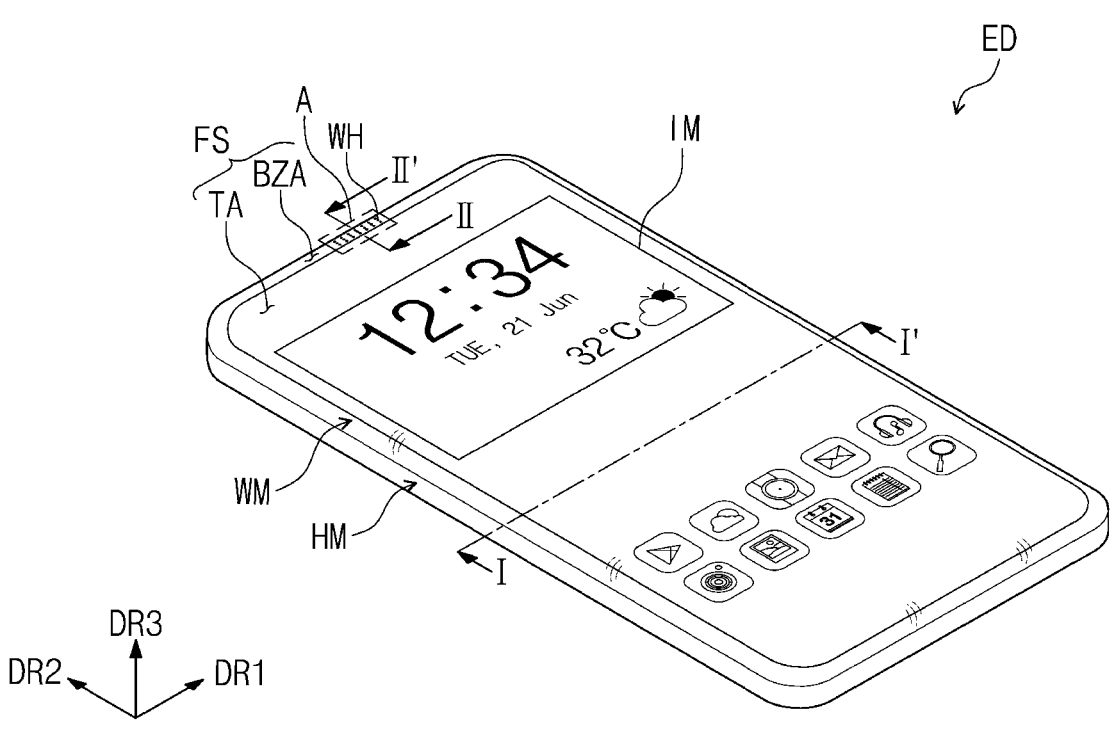
FIG. 1A is a perspective view of an electronic device according to an embodiment of the inventive concept.

In the inventive concept, various modifications may be made, and various forms may be applied, and some example embodiments will be illustrated in the drawings and described in further detail in the following description. However, this is not intended to limit the inventive concept to a specific disclosure form, and it is to be understood to include all changes, equivalents, and substitutes included in the spirit and scope of the inventive concept.

It is to be understood that when an element (or region, layer, portion, etc.) is referred to as being "on," "connected to," or "coupled to" another element, it means that it is either placed/connected/coupled directly on the other element, or one or more third elements may be disposed therebetween.

Meanwhile, in the present application, "directly disposed" may mean that there is no layer, film, region, plate, etc. added between a portion such as a layer, film, region, or plate and another portion. For example, "directly disposed" may mean placing two layers or two members without using an additional member such as an adhesive member therebetween.

Like reference numerals or symbols refer to like elements. In addition, in the drawings, thicknesses, ratios, and dimensions of components may be exaggerated for an effective description of technical content. "And/or" includes all combinations of one or more that the associated elements may define.

Terms such as "first" and "second" may be used to describe various components, but the components should not be limited by these terms. These terms are used for the purpose of distinguishing one component from other components. For example, without departing from the scope of the present invention, a first component may be referred to as a second component, and, similarly, a second component may be referred to as a first component. Singular expressions include plural expressions unless the context clearly indicates otherwise.

In addition, terms such as "below," "lower," "above," and "upper" are used to describe the relationship between components shown in the drawings. The terms are relative concepts and are described based on the directions indicated in the drawings. Thus, the example term "below" can encompass both an orientation of above and below.

Unless otherwise defined, all terms (including technical and scientific terms) used in this specification have the same meaning as commonly understood by one of ordinary skill in the art to which this invention belongs. In addition, terms such as terms defined in commonly used dictionaries should be interpreted as having a meaning consistent with the meaning in the context of the related technology, and should not be interpreted as too ideal or too formal unless explicitly defined here.

It is to be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Herein, an electronic device according to an embodiment of the inventive concept will be explained in further detail with reference to the accompanying drawings.

Figure 1B:
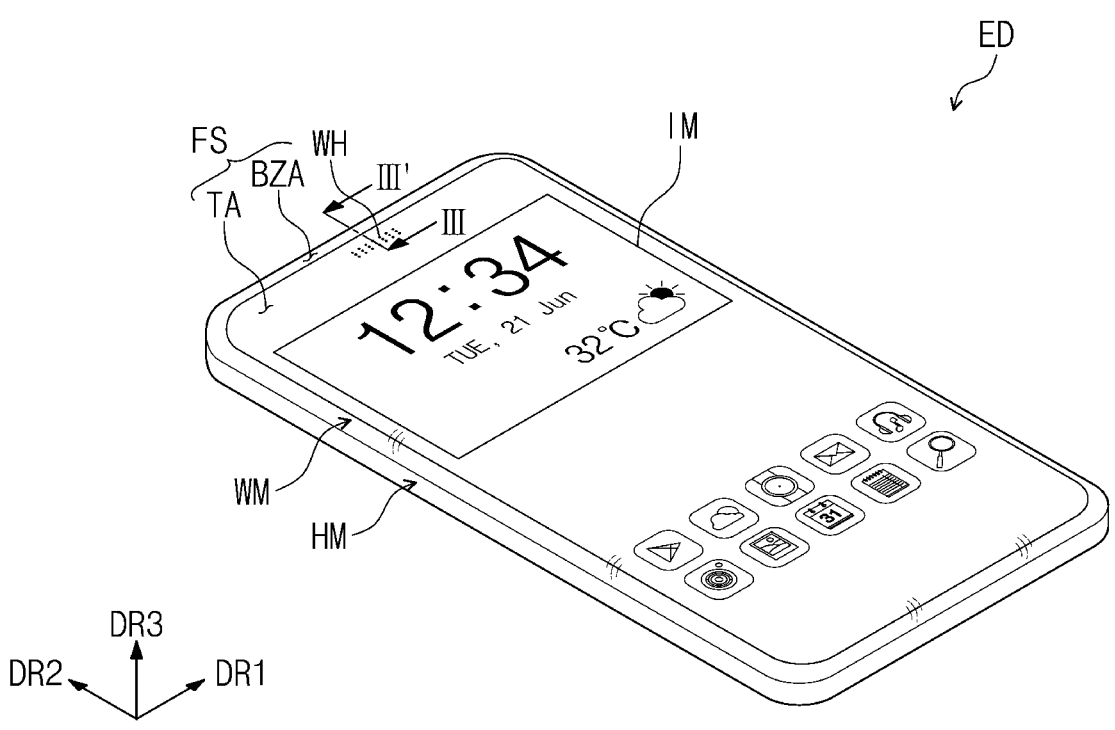
FIG. 1B is a perspective view of an electronic device according to an embodiment of the inventive concept.
Figure 2:
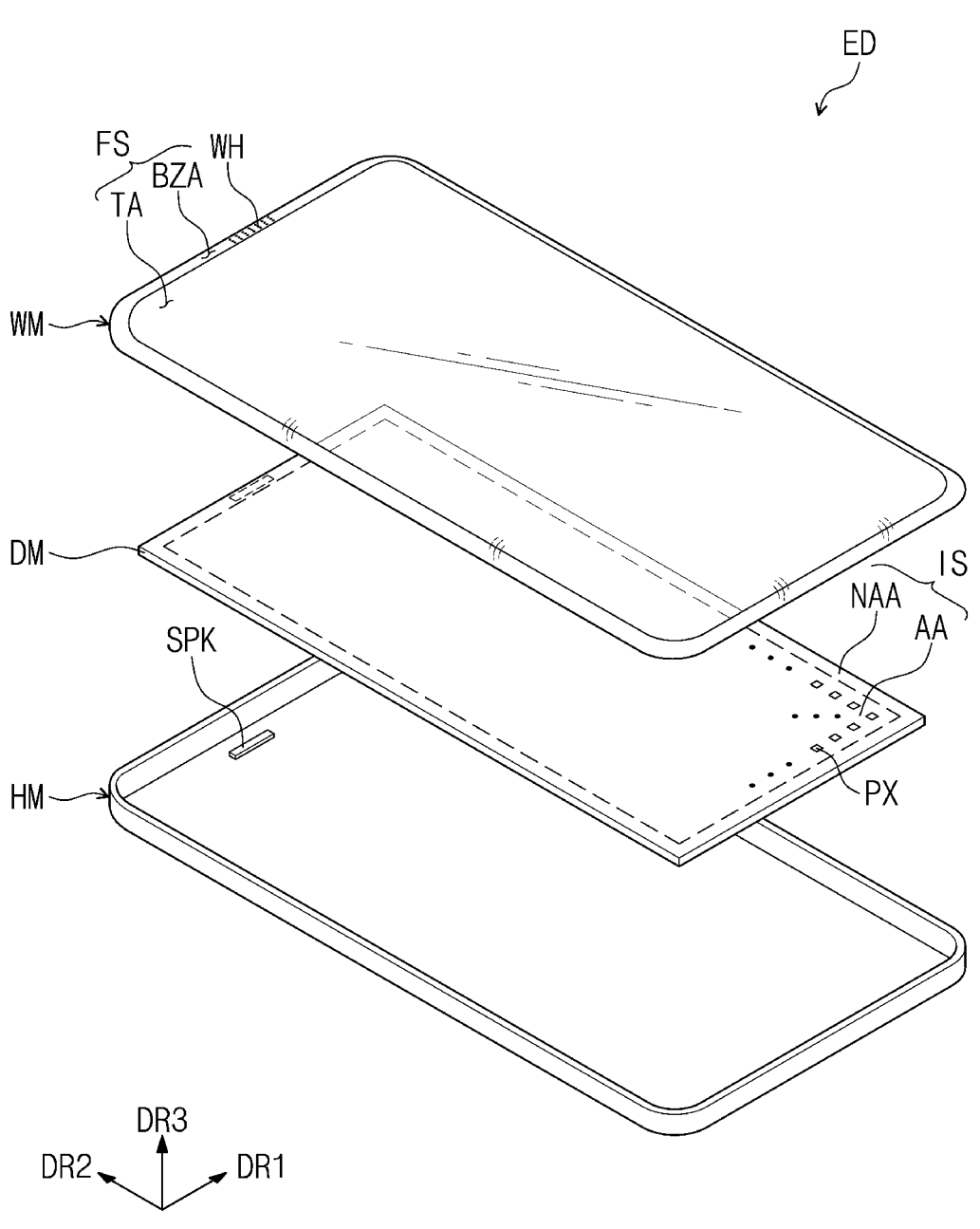
FIG. 2 is an exploded perspective view of an electronic device according to an embodiment of the inventive concept.

FIGS. 1A and 1B are perspective views of an electronic device according to an embodiment of the inventive concept. FIG. 2 is an exploded perspective view of an electronic device according to an embodiment of the inventive concept.

Referring to FIGS. 1A, 1B, and 2, an electronic device ED according to an embodiment may be a device activated in response to an electrical signal. The electronic device ED may include various embodiments. For example, the electronic device ED may be a mobile phone, a tablet computer, a monitor, a television, a car navigation system, a game console, or a wearable device, but is not limited thereto. FIG. 1A and other figures illustrate an example in which the electronic device ED is a mobile phone.

The electronic device ED according to an embodiment may include a window WM, a display module DM, an electronic module SPK, and a housing member HM.

The window WM may include an optically transparent insulating material. For example, the window WM may include a glass material. The window WM may include alkali glass, alkali-free glass, ceramic glass, or the like. In an embodiment, the window WM may be a glass substrate.

The window WM may include a front surface FS exposed to the outside. The front surface FS of the window WM may be divided into a transmission region TA and a bezel region BZA on a plane defined by a first direction DR1 and a second direction DR2 crossing the first direction DR1. In this specification, a front surface (or a top surface) and a rear surface (or a bottom surface) of each component are defined based on a direction in which an image IM is displayed. The front surface and the rear surface may be opposed to each other in a third direction DR3 perpendicular to the first direction DR1 and the second direction DR2, and the normal line direction of each of the front and the rear surface may be parallel to the third direction DR3.

The transmission region TA may be a region through which incident light is transmitted. The transmission region TA may include a flat surface on the plane defined by the first direction DR1 and the second direction DR2. The transmission region TA may include a curved surface bent respectively from four sides of the flat surface. The transmission region TA may include curved surfaces bent from each of four sides of the flat surface. The transmission region TA may overlap a display region AA. The image IM displayed in the display region AA of the display module DM may be viewed from the outside through the transmission region TA. The image IM may include a static image as well as a dynamic image. FIGS. 1A and 1B illustrate an Internet search box and a clock window, etc. as an example of the image IM.

The bezel region BZA may be a region having a relatively low light transmittance compared to the transmission region TA. The bezel region BZA defines the shape of the transmission region TA. The bezel region BZA is adjacent to the transmission region TA, and may surround at least a part of the transmission region TA.

The bezel region BZA may have a color (e.g., a predetermined color) due to a light-blocking pattern BM (see FIG. 3) to be described later. The bezel region BZA may cover a peripheral region NAA of the display module DM, and thus may block the peripheral region NAA from being viewed to the outside. However, this is illustrated as an example, and the bezel region BZA may be omitted from the window WM according to an embodiment of the inventive concept.

In an embodiment, at least one hole WH may be defined in the window WM. The hole WH may be defined in at least one of the transmission region TA or the bezel region BZA. For example, as illustrated in FIG. 1A, the hole WH may be defined in the bezel region BZA. Also, as illustrated in FIG. 1B, the hole WH may be defined in the transmission region TA. In the inventive concept, the hole WH may include both a through-hole penetrating the window WM and a cavity penetrating a portion of the window WM. The hole WH defined in the window WM will be further explained later referring to FIG. 4A, etc.

The electronic device ED according to an embodiment may further include an adhesive layer (not shown) disposed between the window WM and the display module DM. The adhesive layer may combine the window WM and the display module DM together. The adhesive layer may be an optically clear adhesive film (OCA), an optically clear adhesive resin layer (OCR), or a pressure-sensitive adhesive film (PSA), but is not limited thereto.

The display module DM may display an image IM in response to an electrical signal and may transmit and receive information pertaining to an external input. The display module DM may include a display surface IS in which the image IM is displayed. The display surface IS may be divided into the display region AA and the peripheral region NAA. The image IM is displayed in the display region AA. The display region AA may correspond to the transmission region TA. The peripheral region NAA is adjacent to the display region AA. The peripheral region NAA may surround at least a part of the display region AA. The peripheral region NAA may correspond to the bezel region BZA.

The display module DM may include a plurality of pixels PX. The pixels PX display light in response to an electrical signal. Lights displayed by the pixels PX display the image IM.

The housing member HM is coupled to the window WM to form an exterior of the electronic device ED. The housing member HM may include a material having a relatively high rigidity. For example, the housing member HM may include a plurality of frames and/or plates made of glass, plastic, or metal. The housing member HM provides an inner space (e.g., a predetermined inner space). The housing member HM may accommodate the display module DM and the electronic module SPK, etc. The display module DM and the electronic module SPK may be accommodated in the inner space of the housing member HM and protected from an external impact.

The electronic device according to an embodiment may include the electronic module SPK. For example, the electronic module SPK may be a speaker, a microphone, or a sensor for sensing light, heat, or the like. The electronic module SPK may be disposed in a region overlapping the hole WH in the inner space of the housing member HM. For example, the electronic module SPK may be disposed on a same plane as the display module DM under the window WH. In addition, the electronic module SPK may be disposed under the window WM and the display module DM. In an embodiment, the electronic module SPK may be a speaker. A sound emitted from the speaker may pass through the hole WH defined in the window WM to the outside of the electronic device ED.

Figure 3:
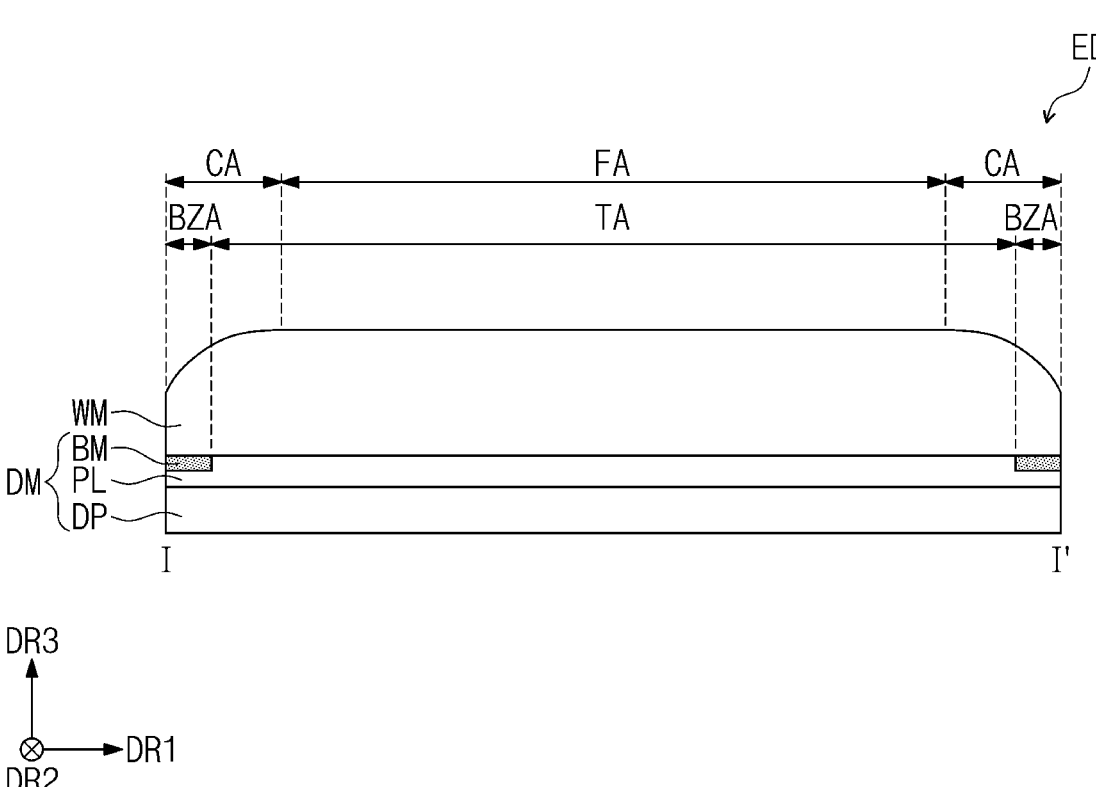
FIG. 3 is a cross-sectional view of an electronic device according to an embodiment of the inventive concept.

FIG. 3 is a cross-sectional view of an electronic device according to an embodiment of the inventive concept. FIG. 3 is a cross-sectional view illustrating a partial configuration of a region taken along the line I-I' of FIG. 1A. FIG. 3 illustrates the window WM and the display module DM in a part taken along the line I-I' of FIG. 1A.

Although FIG. 3 illustrates a cross-section of the electronic device ED cut in the first direction DR1, the cross-section thereof has a substantially same shape as a cross-section of the electronic device ED cut in the second direction DR2 except for a region in which the hole WH (see FIGS. 1A and 1B) is defined. In the description of the electronic device ED according to an embodiment illustrated in FIG. 3, contents duplicated with those described with reference to FIGS. 1A, 1B, and 2 are not described again, but a description will be mainly focused on differences.

Referring to FIGS. 1A, 1B, 2, and 3 together, the electronic device ED may include the window WM and the display module DM, and the display module DM may include a display panel DP, an anti-reflection layer PL, and a light-blocking pattern BM.

The display panel DP may be a light-emitting display panel, but is not particularly limited. For example, the display panel DP may be an organic light-emitting display panel or an inorganic light-emitting display panel. A light-emitting element of the organic light-emitting display panel may include an organic light-emitting material. A light-emitting element of the inorganic light-emitting display panel may include quantum dots, quantum rods, or the like. In addition, the display panel DP according to an embodiment may include a micro LED element and/or a nano LED element, but is not particularly limited thereto.

In an embodiment, the display panel DP may include a base layer, a circuit element layer disposed on the base layer, a display element layer disposed on the circuit element layer, and a thin-film encapsulation layer disposed on the display element layer. The base layer may include a polymer material. For example, the base layer may include polyimide.

The circuit element layer may include an organic layer, an inorganic layer, a semiconductor pattern, a conductive pattern, and a signal line, etc. The organic layer, the inorganic layer, a semiconductor layer, and a conductive layer may be formed on the base layer through coating, deposition, etc. Thereafter, the organic layer, the inorganic layer, the semiconductor layer, and the conductive layer may be selectively patterned to form the semiconductor pattern, the conductor pattern, and the signal line through performing a photolithography process multiple times.

The display element layer may include a light-emitting element. The light-emitting element is electrically connected to at least one transistor. The thin-film encapsulation layer may be disposed on the circuit element layer to seal the display element layer. In an embodiment, the thin-film encapsulation layer may include an inorganic layer, an organic layer, and an inorganic layer which are sequentially stacked. However, a stacked structure of the thin-film encapsulation layer is not particularly limited.

The anti-reflection layer PL may be disposed on the display panel DP. The anti-reflection layer PL may prevent or substantially prevent reflected light of light incident from the outside of the electronic device ED from being viewed by a user. In an embodiment, the anti-reflection layer PL may include a polarization layer that polarizes at least a portion of light incident from the outside of the electronic device ED. In addition, the anti-reflection layer PL may include a color filter layer.

The light-blocking pattern BM may be disposed on a lower surface of the window WM. The light-blocking pattern BM may have a color (e.g., a predetermined color). The color may be black, but is not limited thereto. The light-blocking pattern BM defines a boundary between the transmission region TA and the bezel region BZA of the window WM. The light-blocking pattern BM may include a light-absorbing material, but is not limited to any particular material. In an embodiment, the light-blocking pattern BM may prevent or substantially prevent components disposed in the peripheral region NAA of the display module DM from being viewed by a user.

The window WM may include a first region FA parallel to a flat surface on the plane defined by the first direction DR1 and the second direction DR2 crossing the first direction DR1, and a second region CA extending from the first region FA. The second region CA may be disposed outside the first region FA and surround the first region FA. The second region CA may provide an edge of the window WM. The edge may correspond to a side surface WS (see FIG. 5A) of the window WM to be described later. The second region CA is a part bent from at least one side of the first region FA and may provide a curved surface. For example, the second region CA may provide curved surfaces respectively bent from four sides of the first region FA. However, embodiments are not limited thereto, and the second region CA may provide curved surfaces respectively bent from each of two sides of the first region FA, for example.

In an embodiment, the first region FA may overlap the transmission region TA of the window WM and may not overlap the bezel region BZA. In an embodiment, the second region CA may overlap the bezel region BZA of the window WM and may overlap at least a part of the transmission region TA.

Figure 4A:
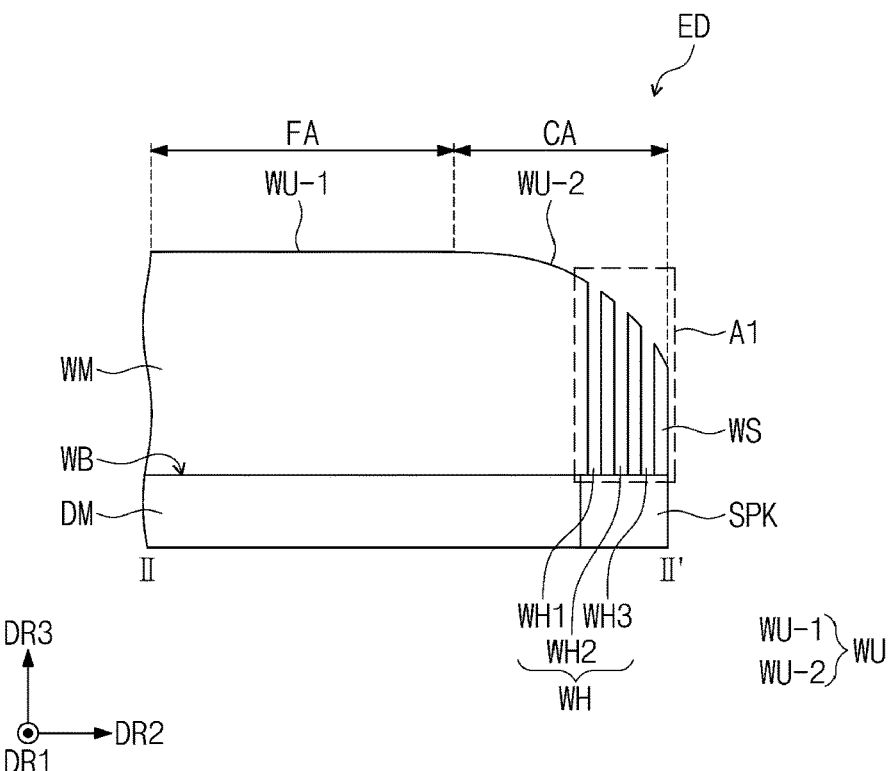
FIGS. 4A to 4D are each a cross-sectional view of an electronic device according to an embodiment of the inventive concept.
Figure 4B:
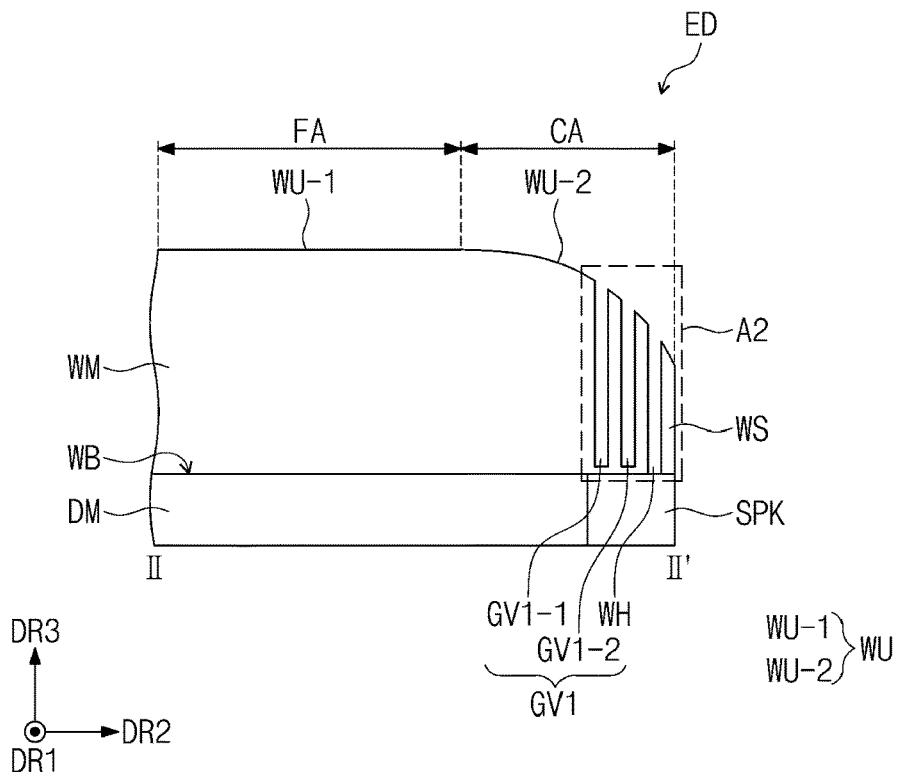
Figure 4C:
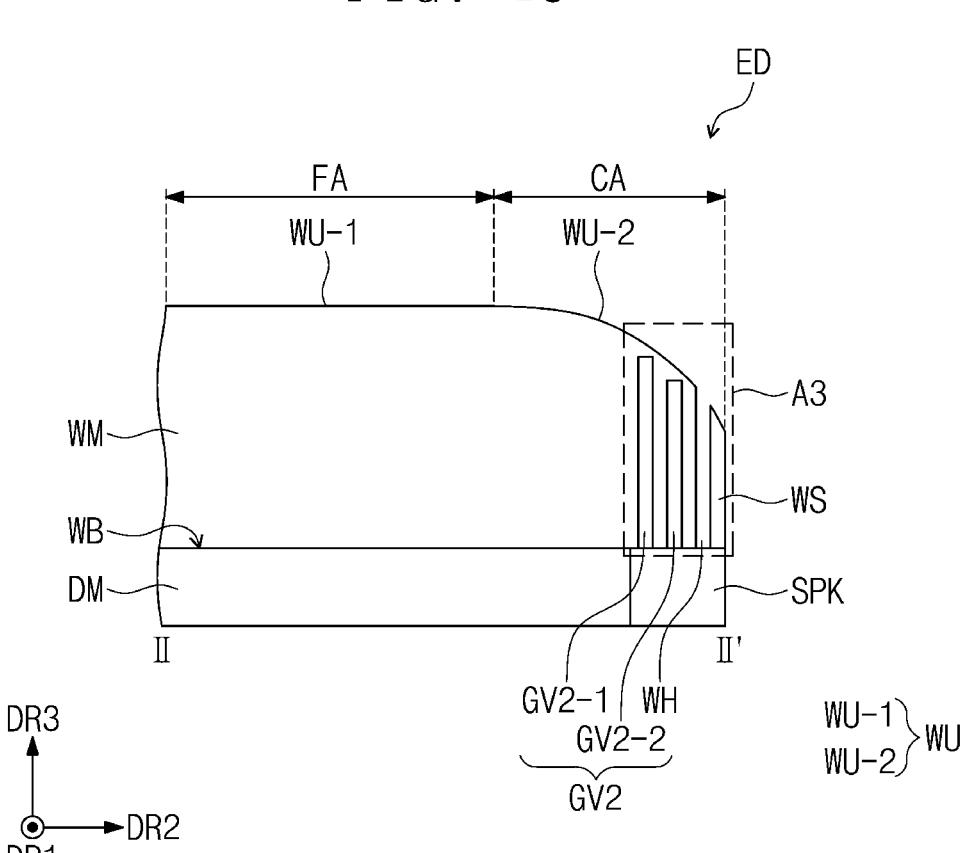
Figure 4D:
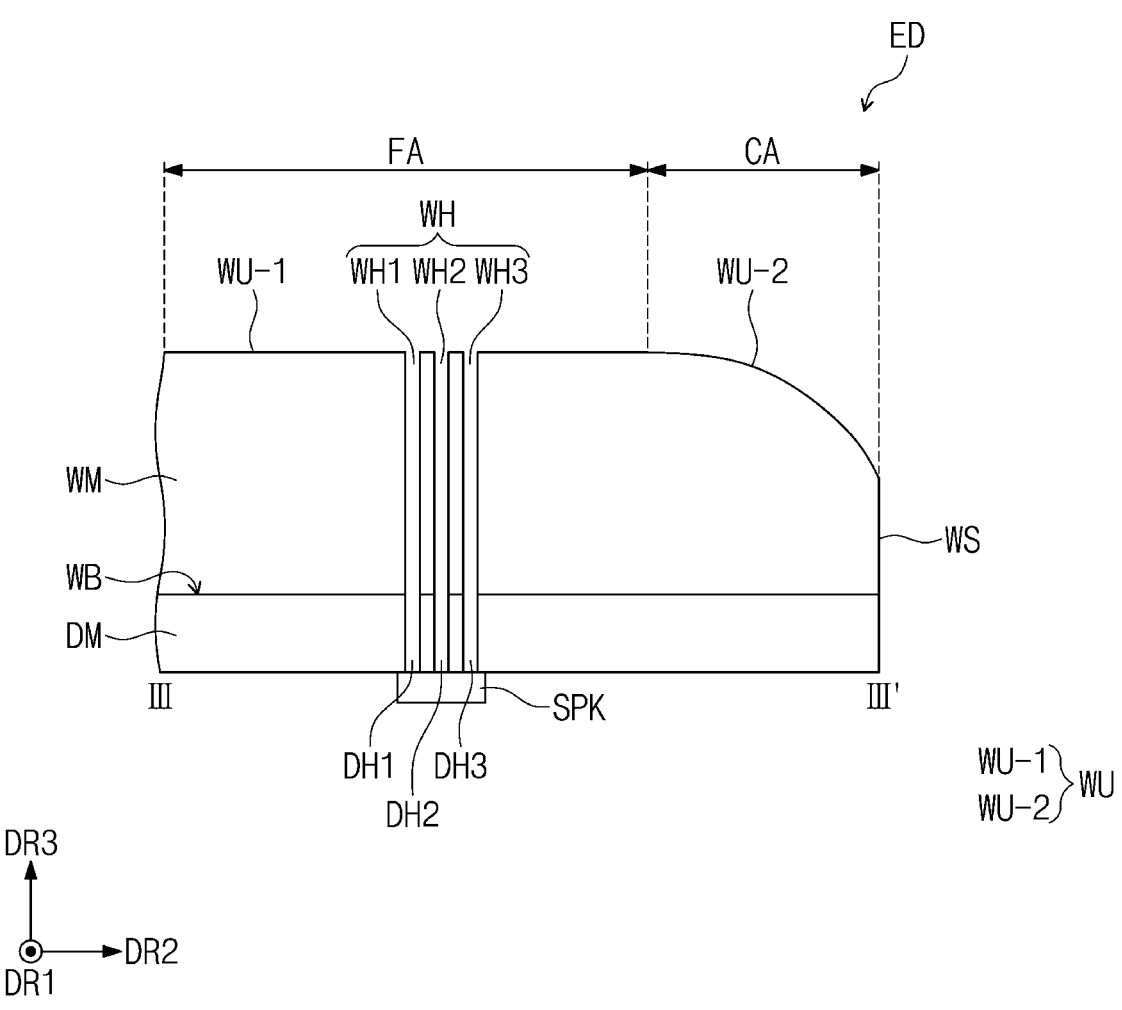
Figure 5A:
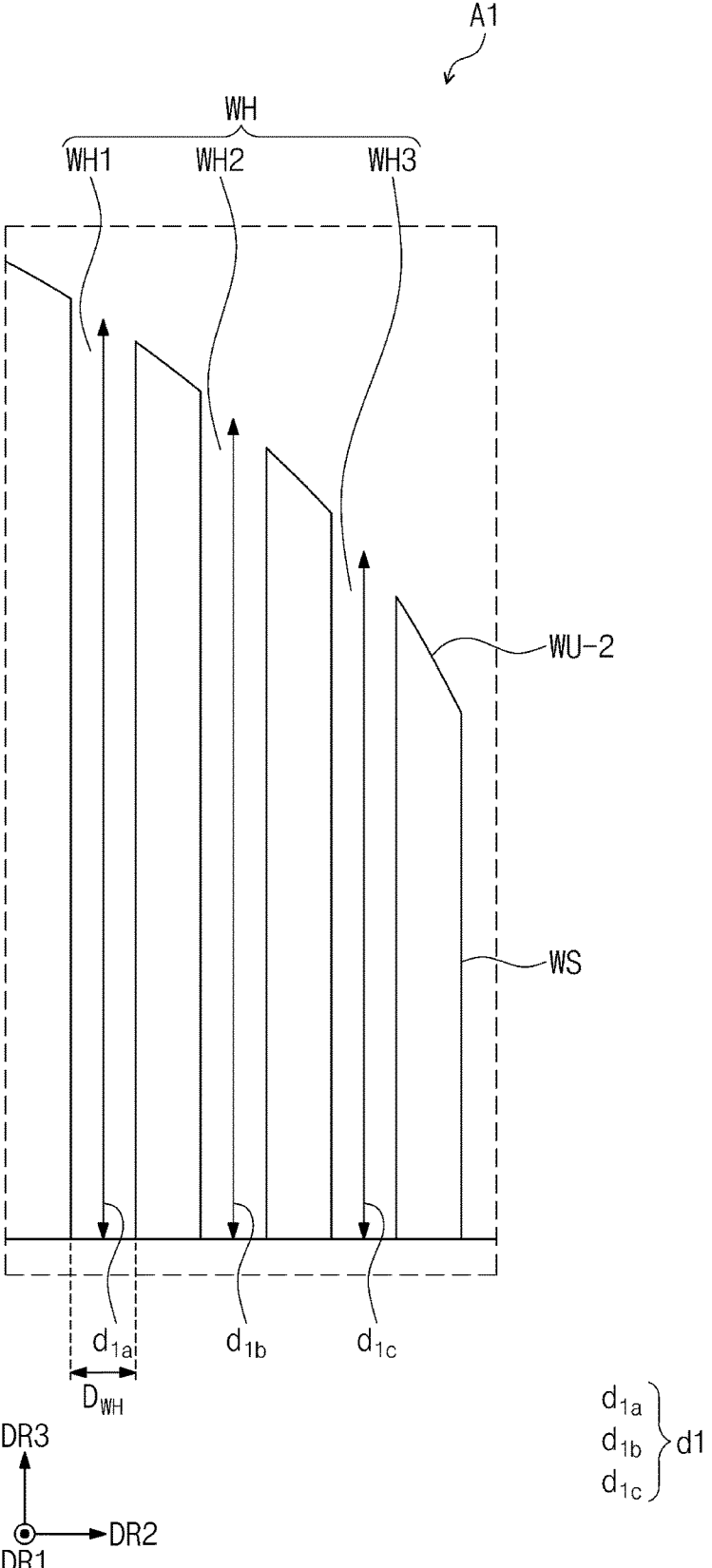
FIGS. 5A to 5D are each an enlarged cross-sectional view illustrating a region of a cross-section of an electronic device according to an embodiment of the inventive concept.
Figure 5B:
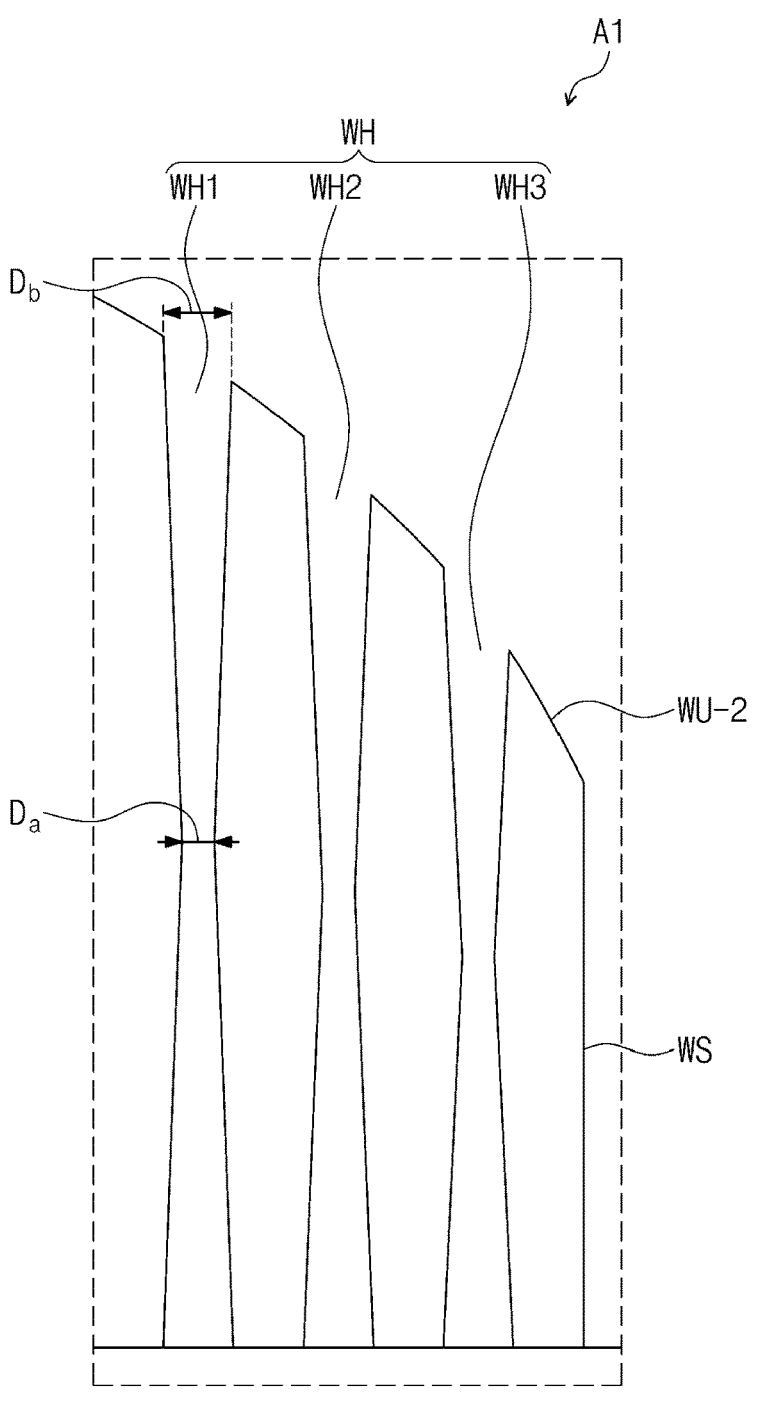
Figure 5B:
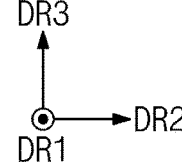
Figure 5C:
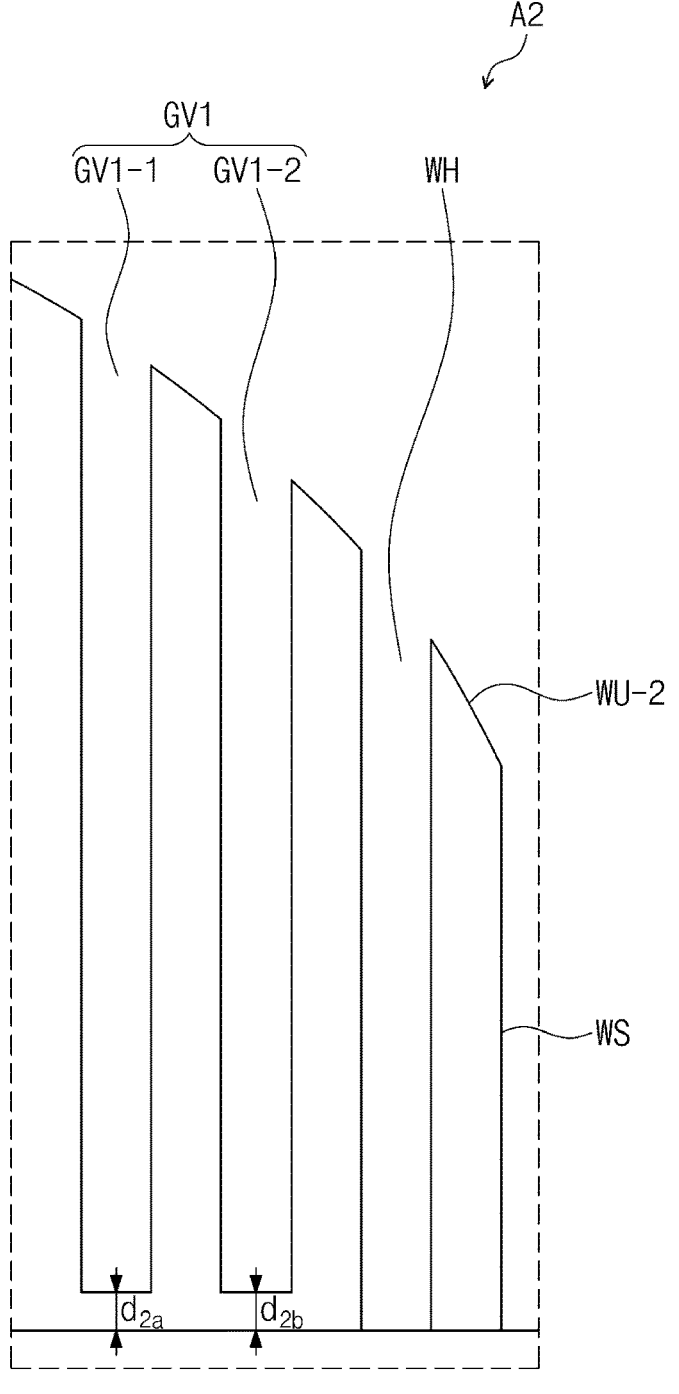
Figure 5D:
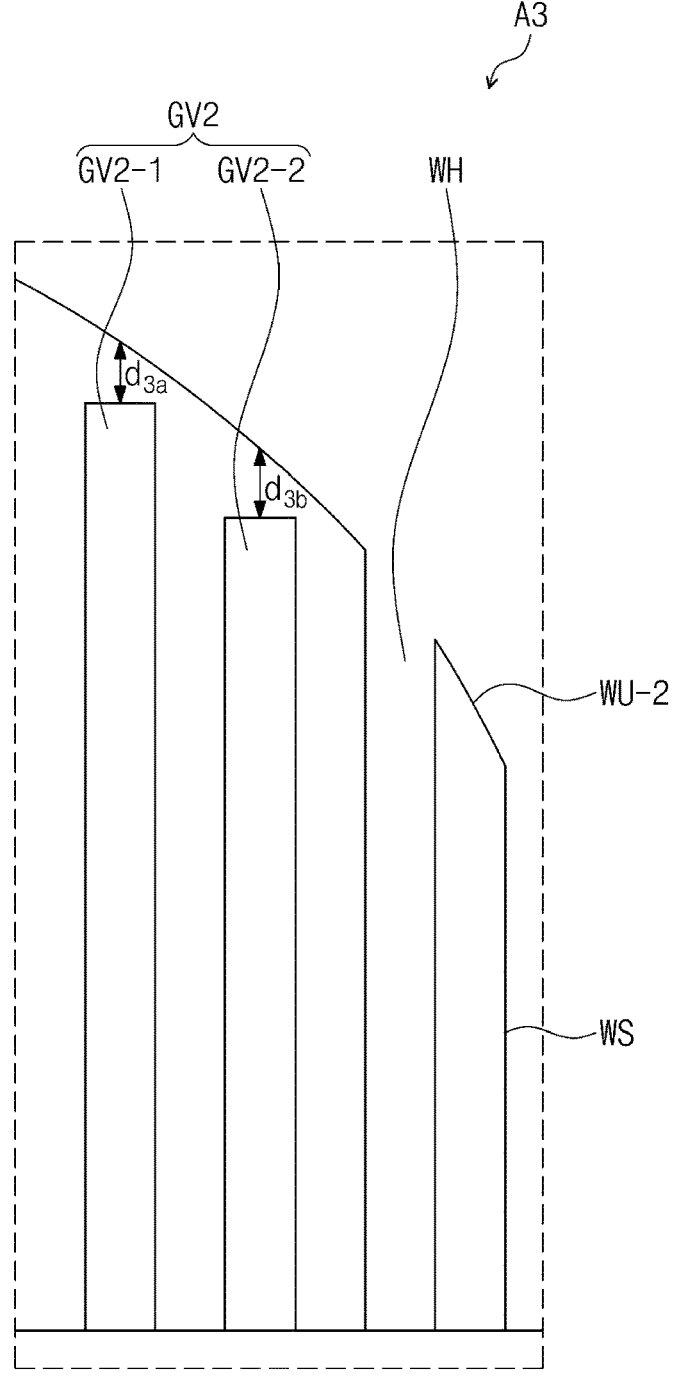

FIGS. 4A to 4D are cross-sectional views of an electronic device according to an embodiment. FIGS. 4A and 4B are each a cross-sectional view illustrating a partial configuration of a region taken along the line II-II' of FIG. 1A. FIG. 4C illustrates another embodiment corresponding to that of FIG. 4B. FIG. 4D is a cross-sectional view illustrating a partial configuration of a region taken along the line III-III' of FIG. 1B. FIGS. 4A to 4D illustrate a window and a display module included in an electronic device. FIGS. 5A to 5D are enlarged cross-sectional views illustrating a region of a cross-section of an electronic device according to an embodiment. FIGS. 5A and 5B are each an enlarged cross-sectional view illustrating a region "A1" of FIG. 4A. FIG. 5C is an enlarged cross-sectional view illustrating a region "A2" of FIG. 4B, and FIG. 5D is an enlarged cross-sectional view illustrating a region "A3" of FIG. 4C.

Referring to FIGS. 4A to 4D and FIGS. 5A to 5D, the window WM may include an upper surface WU, a lower surface WB, and a side surface WS. The upper surface WU and the lower surface WB of the window WM may face each other. The side surface WS may connect the upper surface WU and the lower surface WB. The side surface WS may be a part which corresponds to an edge of the window WM.

The upper surface WU may include a flat surface WU-1 and a curved surface WU-2. The flat surface WU-1 may be defined by the first direction DR1 and the second direction DR2 crossing the first direction DR1. The curved surface WU-2 may extend from the flat surface WU-1 and connect to the side surface WS. A curved slope of the curved surface WU-2 may be steeper toward the side surface WS. That is, a curvature of the curved surface WU-2 may increase in a direction toward the edge of the window WM. A radius of curvature of the curved surface WU-2 may decrease in a direction adjacent to the edge of the window WM. The side surface WS may extend from the lower surface WB along the third direction DR3. The side surface WS may extend from the lower surface WB in a normal line direction and may connect to the curved surface WU-2. The upper surface WU and the lower surface WB may overlap the first region FA and the second region CA. The side surface WS may not overlap the first region FA and may overlap the second region CA.

In an embodiment, the hole WH may be defined in the window WM. The hole WH may be defined in at least one region of the window WM. In an embodiment, the hole WH may be defined in plural in at least one region of the first region FA or the second region CA. In an embodiment, when the hole WH is defined in plural in the window WM, the holes WH may be arranged in a mesh-shaped pattern. For example, about 117 holes WH may be arranged in the first direction DR1 and about 117 holes WH may be arranged side by side along the second direction DR2 to form a mesh shape. In the electronic device ED according to an embodiment, fine holes WH, which may reduce hole visibility, may be defined in the window WM, and, thus, a sense of unity in terms of design may be improved, thereby improving aesthetics.

When the hole WH is defined in plural in the window WM, the holes WH may be used as speaker holes. Each of the plurality of the holes WH may be arranged on a plane alongside the edge of the window WM. In addition, a single hole WH may be defined in the window WM. The single hole WH may be defined in one of the first region FA or the second region CA. The single hole WH defined in the window WM may be used with any of various sensors, such as a barometric pressure sensor, a temperature sensor, and an infrared sensor, or as a microphone hole, etc., in the electronic device ED.

Referring to FIGS. 4A and 5A, the hole WH may be defined in plural in the window WM, and the holes WH may include a first through-hole WH1, a second through-hole WH2, and a third through-hole WH3. The first through-hole WH1, the second through-hole WH2, and the third through-hole WH3 may be defined in the second region CA of the window WM along the second direction DR2. In this case, the electronic module SPK may overlap the second region CA under the window WM.

The first through-hole WH1, the second through-hole WH2, and the third through-hole WH3 may each be defined in plural in the second region CA of the window WM. The first through-hole WH1, the second through-hole WH2, and the third through-hole WH3 may each be defined in plural in the second region CA along the first direction DR1. The first through-hole WH1, the second through-hole WH2, and the third through-hole WH3 may be arranged alongside the edge of the window WM in a direction close to the edge.

In an embodiment, the hole WH defined in the window WM may have a diameter, or width, DWH of tens of micrometers to hundreds of micrometers. The hole WH defined in the window WM may have low visibility and thus may improve a sense of unity in terms of the design of an electronic device ED.

In an embodiment, the hole WH may have a depth d1 of about 1 mm or less. When the hole WH is defined in plural in the window WM, the plurality of holes WH may have different depths. For example, the first through-hole WH1 may have a first depth $d_{1a}$, the second through-hole WH2 may have a second depth $d_{1b}$, and the third through-hole WH3 may have a third depth die. On a plane view, the depth d1 of the hole WH may become smaller toward the edge of the window WM, that is, toward the side surface WS of the window WM. For example, the third depth $d_{1c}$ may be smaller than the first depth $d_{1a}$ and the second depth $d_{1b}$, and the second depth $d_{1b}$ may be smaller than the first depth $d_{1a}$.

In an embodiment, the hole WH may be a through-hole that penetrates the window WM, and a diameter of a central portion of the through-hole and a diameter of an end-most portion of the through-hole may be different from each other by an etching operation of a method for manufacturing an electronic device according to an embodiment to be described later. Referring to FIG. 5B, on a plane view, the diameter, or width, of the hole WH may become greater from a central portion of the hole WH toward a normal line direction of the window WM. For example, on a plane view, a width of the first through-hole WH1 may become greater from the central portion toward the end-most portion. In the first through-hole WH1, a difference between a width $D_a$ of the central portion and a width $D_b$ of the end-most portion may be about 1 μm to tens of micrometers (μm). This description may similarly apply to the second through-hole WH2 and the third through-hole WH3.

Referring to FIGS. 4B, 4C, 5C, and 5D, the through-hole WH and cavities GV1 and GV2 may be defined in the window WM. The through-hole WH may be more adjacent, or nearer, to the edge of the window WM than the cavities GV1 and GV2. That is, the through-hole WH may be more adjacent, or nearer, to the side surface WS of the window WM than the cavities GV1 and GV2. However, embodiments of the inventive concept are not limited thereto and, unlike what is illustrated in the drawings, the cavities GV1 and GV2 may be more adjacent, or nearer, to the side surface WS of the window WM than the through-hole WH.

In an embodiment, the hole WH may include a through-hole WH and a first cavity GV1 recessed from the upper surface WU of the window WM. The first cavity GV1 may extend from the upper surface WU of the window WM and may not penetrate the lower surface WB of the window WM. In an embodiment, a distance d2 between the first cavity GV1 and the lower surface WB of the window WM may be about 20 μm to about 30 μm.

The first cavity GV1 may be defined in plural in the window WM. For example, a (1-1)-th cavity GV1-1, a (1-2)-th cavity GV1-2, and the through-hole WH may be defined in the window WM. The (1-1)-th cavity GV1-1, the (1-2)-th cavity GV1-2, and the through-hole WH may be defined in the second region CA of the window WM along the second direction DR2. In an embodiment, a distance $d_{2a}$ between the (1-1)-th cavity GV1-1 and the lower surface WB of the window WM and a distance deb between the (1-2)-th cavity GV1-2 and the lower surface WB of the window WM may each be about 20 μm to about 30 μm. The (1-1)-th cavity GV1-1, the (1-2)-th cavity GV1-2, and the through-hole WH may each be defined in plural in the second region CA of the window WM. The (1-1)-th cavity GV1-1, the (1-2)-th cavity GV1-2, and the through-hole WH may be each defined in plural in the second region CA along the first direction DR1. The (1-1)-th cavity GV1-1, the (1-2)-th cavity GV1-2, and the through-hole WH may be arranged alongside the edge of the window WM in a direction close to the edge of the window WM. The through-hole WH may be more adjacent, or nearer, to the edge of the window WM than the (1-1)-th cavity GV1-1 and the (1-2)-th cavity GV1-2.

In an embodiment, the hole WH may include a through-hole WH and a second cavity GV2 recessed from the lower surface WB of the window WM. The second cavity GV2 may extend from the lower surface WB of the window WM and may not penetrate the upper surface WU of the window WM. In an embodiment, a distance d3 between the second cavity GV2 and the upper surface WU of the window WM may be about 20 μm to about 30 μm.

The second cavity GV2 may be defined in plural in the window WM. For example, a (2-1)-th cavity GV2-1, a (2-2)-th cavity GV2-2, and the through-hole WH may be defined in the window WM. The (2-1)-th cavity GV2-1, the (2-2)-th cavity GV2-2, and the through-hole WH may be defined in the second region CA of the window WM along the second direction DR2. In an embodiment, a distance $d_{3a}$ between the (2-1)-th cavity GV2-1 and the upper surface WU of the window WM and a distance dab between the (2-2)-th cavity GV2-2 and the upper surface WU of the window WM may be each about 20 μm to about 30 μm. The (2-1)-th cavity GV2-1, the (2-2)-th cavity GV2-2, and the through-hole WH may each be defined in plural in the second region CA of the window WM. The (2-1)-th cavity GV2-1, the (2-2)-th cavity GV2-2, and the through hole WH may each be defined in plural in the second region CA along the first direction DR1. The (2-1)-th cavity GV2-1, the (2-2)-th cavity GV2-2, and the through-hole WH may be arranged alongside the edge of the window WM in a direction close to the edge. The through-hole WH may be more adjacent, or nearer, to the edge of the window WM than the (2-1)-th cavity GV2-1 and the (2-2)-th cavity GV2-2.

Referring to FIG. 4D, the hole WH may be defined in plural in the window WM, and the hole WH may include a first through-hole WH1, a second through-hole WH2, and a third through-hole WH3. Unlike FIG. 4A, in the electronic device ED illustrated in FIG. 4D, the first through-hole WH1, the second through-hole WH2, and the third through-hole WH3 may be defined in the first region FA of the window WM along the second direction DR2. In the display module DM, a (1-1)-th through-hole DH1, a (2-1)-th through-hole DH2 and a (3-1)-th through-hole DH3 corresponding to the first through-hole WH1, the second through-hole WH2, and the third through-hole WH3 may be defined. The (1-1)-th through-hole DH1 may correspond to the first through-hole WH1, and the (2-1)-th through-hole DH2 may correspond to the second through-hole WH2. In addition, the (3-1)-th through-hole DH3 may correspond to the third through-hole WH3. The (1-1)-th through-hole DH1, the (2-1)-th through-hole DH2, and the (3-1)-th through-hole DH3 may have substantially the same diameters, or widths, as those of the first through-hole WH1, the second through-hole WH2, and the third through-hole WH3, respectively.

In an embodiment, when the hole WH is defined in the first region FA, the electronic module SPK may overlap the first region FA under the window WM and the display module DM. Accordingly, in the electronic device ED according to an embodiment, the bezel region BZA (see FIG. 1B) may be decreased, and an image display region may extend, thereby improving display quality.

In an embodiment, the hole WH defined in the window WM may have a diameter, or width, of tens of micrometers to hundreds of micrometers. In addition, the hole WH may have a depth of about 1 mm or less. When the hole WH is defined in plural in the first region FA of the window WM, the plurality of the holes WH may have the same depth.

Figure 6A:
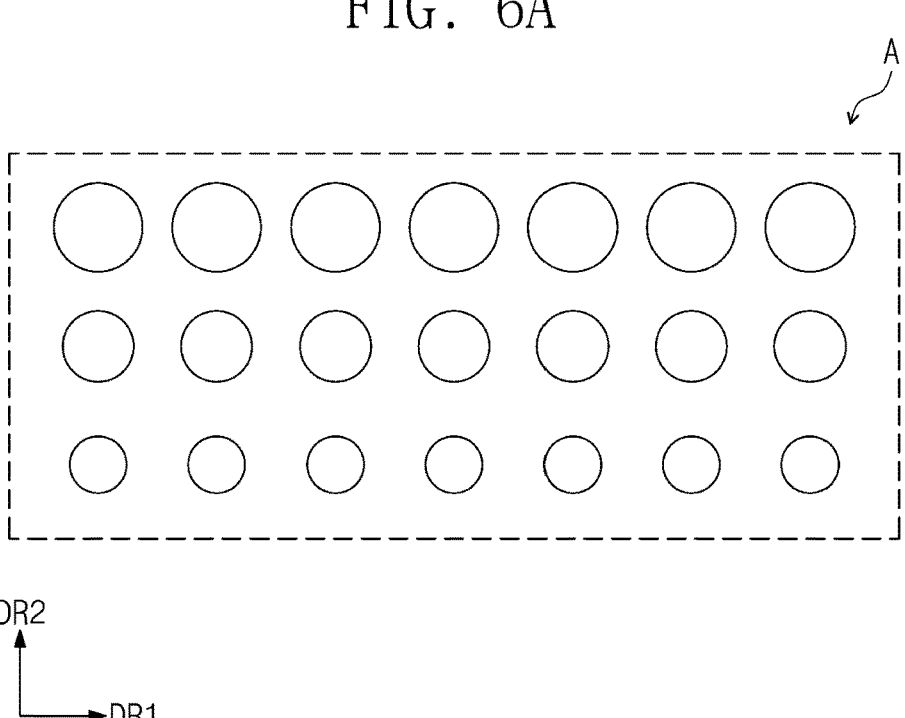
FIGS. 6A and 6B are each a plan view illustrating a part of an electronic device according to an embodiment.
Figure 6B:
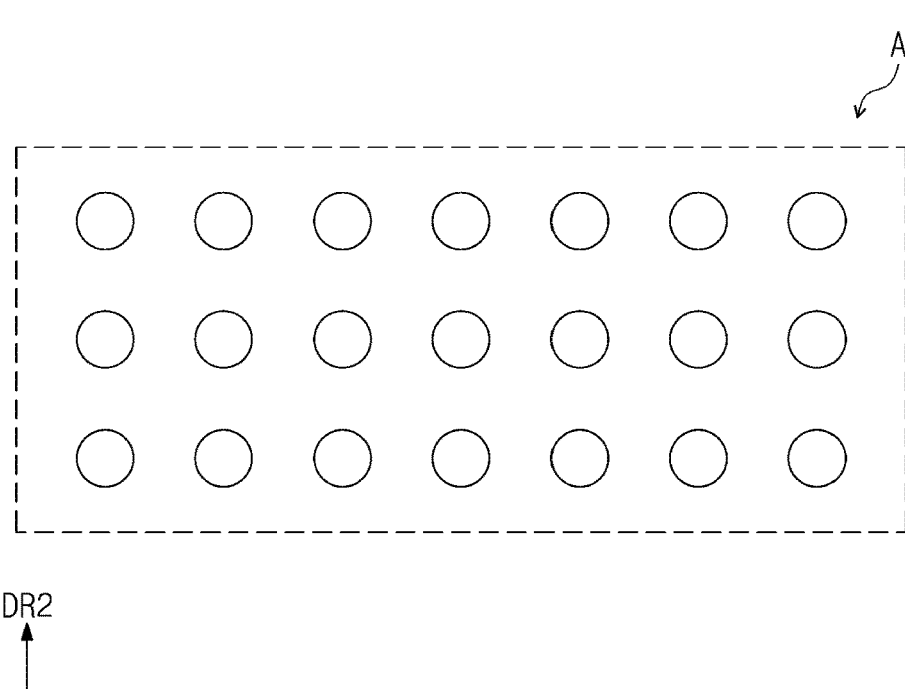

FIGS. 6A and 6B are plan views illustrating a part of an electronic device according to an embodiment. FIG. 6A is a front plan view corresponding to a region "A" of FIG. 1A, and FIG. 6B is a rear plan view corresponding to the region "A" of FIG. 1A. FIG. 6A may correspond to a plan view of the region "A1" of FIG. 4A when viewed from the front, and FIG. 6B may correspond to a plan view of the region "A1" of FIG. 4A when viewed from the rear. In the descriptions of the electronic device ED according to an embodiment illustrated in FIGS. 6A and 6B, contents duplicated with those described with reference to FIGS. 1A, 4A, etc., are not described again, but a description will be mainly focused on differences.

Referring to FIGS. 1A and 4A with 6A, since the upper surface WU of the window WM includes the curved surface WU-2 in the second region CA, among the plurality of the holes WH defined in the window WM, a curved surface area of a hole WH may become greater toward the edge of the window WM.

The lower surface WB of the window WM may be parallel to the flat surface WU-1 of the window WM. Therefore, as illustrated in FIG. 6B, the plurality of the holes WH defined in the window WM may have the same area of the lower surface WB in the second region CA.

Figure 7:
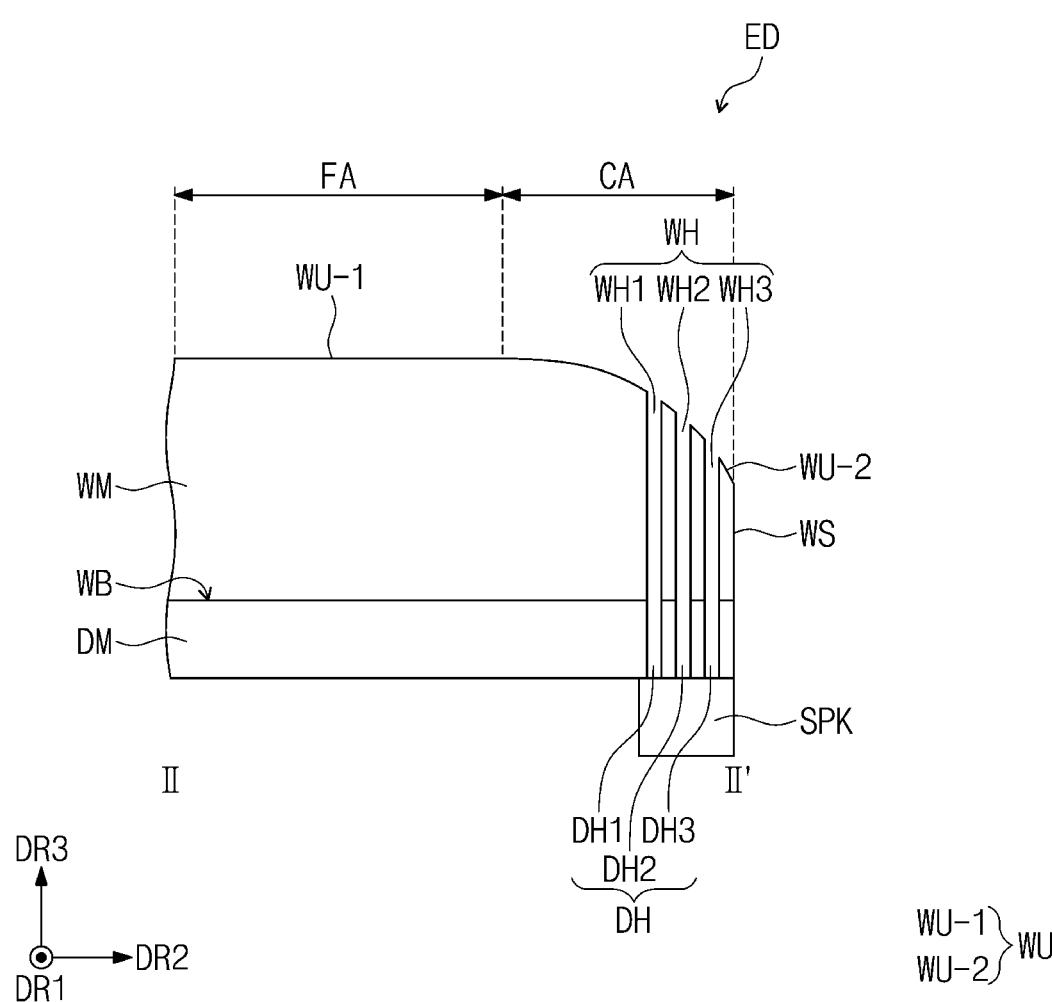
FIG. 7 is a cross-sectional view of an electronic device according to an embodiment.

FIG. 7 is a cross-sectional view of an electronic device according to an embodiment. FIG. 7 is a cross-sectional view illustrating a partial configuration of a region taken along the line II-II' of FIG. 1A. FIG. 7 is another embodiment of FIG. 4A.

Referring to FIG. 7, a hole WH may be defined in the second region CA of the window WM. The hole WH defined in the window WM may be a through-hole. In the electronic device ED according to an embodiment, a through-hole DH which corresponds to the hole WH defined in the window WM may be defined in a display module DM.

For example, the hole WH may be defined in plural in the window WM, and the hole WH may include a first through-hole WH1, a second through-hole WH2, and a third through-hole WH3. The first through-hole WH1, the second through-hole WH2, and the third through-hole WH3 may be defined in the second region CA of the window WM along the second direction DR2. A (1-1)-th through-hole DH1, a (2-1)-th through-hole DH2, and a (3-1)-th through-hole DH3 respectively corresponding to the first through-hole WH1, the second through-hole WH2, and the third-through hole WH3 may be defined in the display module DM. The (1-1)-th through-hole DH1 may correspond to the first through-hole WH1, and the (2-1)-th through-hole DH2 may correspond to the second through-hole WH2. In addition, the (3-1)-th through-hole DH3 may correspond to the third through-hole WH3. The (1-1)-th through-hole DH1, the (2-1)-th through-hole DH2, and the (3-1)-th through-hole DH3 may have substantially the same diameters, or widths, as those of the first through-hole WH1, the second through-hole WH2, and the third through-hole WH3, respectively.

Figure 8:
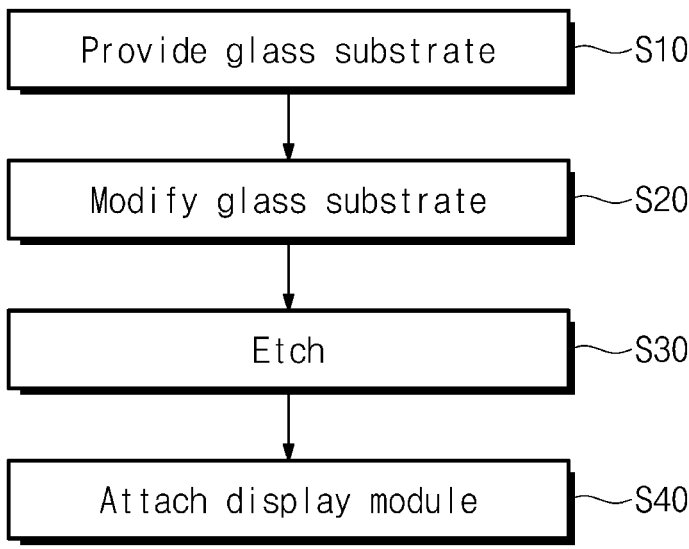
FIG. 8 is a flowchart of a method for manufacturing an electronic device according to an embodiment of the inventive concept.
Figure 9A:
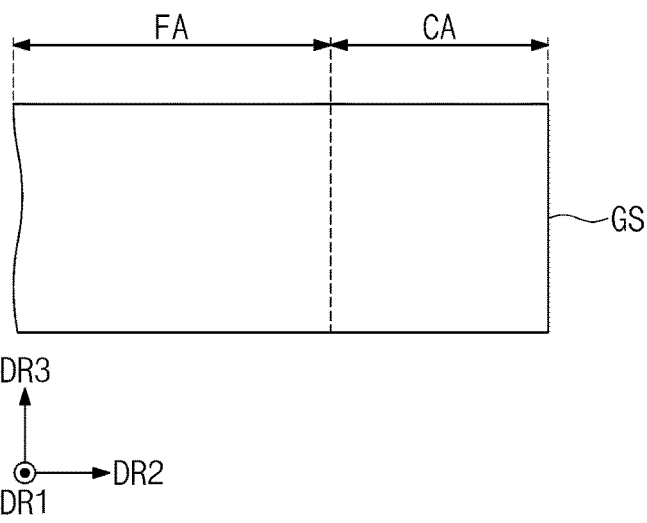
FIGS. 9A to 9C are cross-sectional views illustrating some operations of a method for manufacturing an electronic device according to an embodiment of the inventive concept.
Figure 9B:
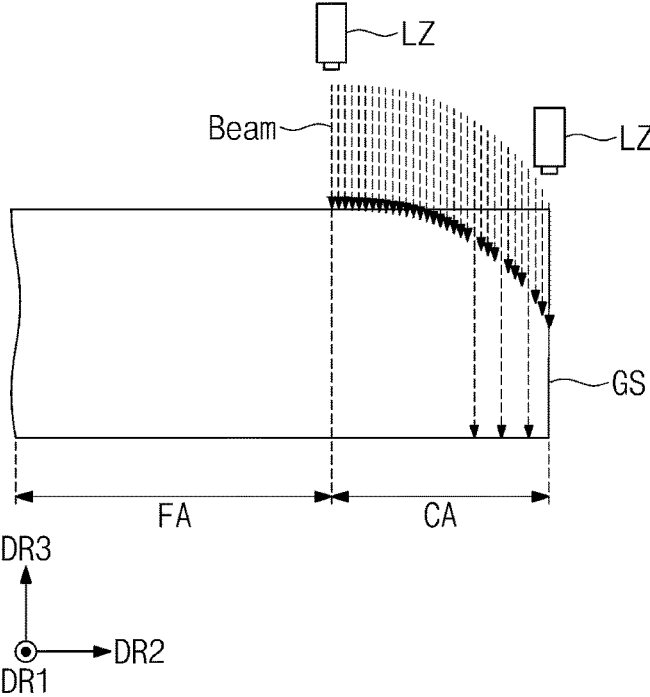
Figure 9C:
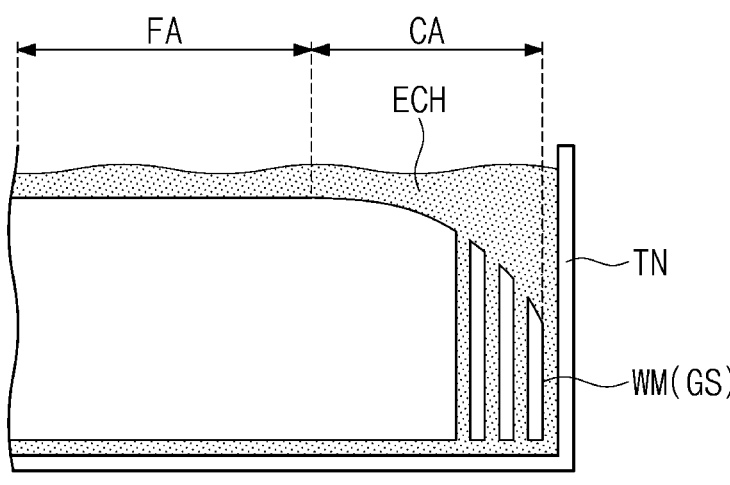
Figure 9C:
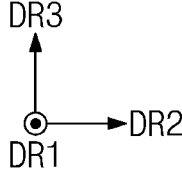

Herein, a method for manufacturing an electronic device according to an embodiment will be described. FIG. 8 is a flowchart of a method for manufacturing an electronic device according to an embodiment of the inventive concept. FIGS. 9A to 9C are cross-sectional views illustrating some operations of a method for manufacturing an electronic device according to an embodiment of the inventive concept. FIGS. 9A to 9C illustrate a method for manufacturing the electronic device described with reference to FIG. 4A. The method for manufacturing the electronic device according to an embodiment described with reference to FIGS. 8 and 9A to 9C may be substantially similarly applied to a method for manufacturing the electronic device according to an embodiment described with reference to FIGS. 4B, 4C, etc.

Referring to FIG. 8, the method for manufacturing an electronic device according to an embodiment of the inventive concept may include providing a glass substrate (510), modifying the glass substrate (S20), etching (S30), and attaching a display module (S40).

Referring to FIGS. 8 and 9A, the providing of a glass substrate GS may include preparing an optically transparent glass substrate GS. The glass substrate GS may have a uniform thickness overall, for example, a thickness of about 20 μm to about 1000 μm. The glass substrate GS may be a cell unit corresponding to a single window or a disk unit corresponding to a plurality of windows. For ease of processing, the glass substrate GS may be fixed to a stage (not shown). A first region FA and a second region CA may be defined in the glass substrate GS. The glass substrate GS may include the first region FA and the second region CA disposed outside the first region FA. The second region CA may be disposed outside the first region FA and provide an edge of the glass substrate GS.

Referring to FIGS. 8 and 9B, the modifying (S20) of the glass substrate GS may be performed. The modifying (S20) of the glass substrate GS may be a pretreatment for providing a curved surface and a hole in the second region CA. The modifying (S20) of the glass substrate GS may include performing a pretreatment for providing the curved surface in the second region CA and providing the hole in the first region FA. The pretreatment may include modifying a glass material by irradiating the glass substrate GS with a beam. In the glass substrate GS, the region modified by the beam may be etched better, or more, than a remaining region which is not irradiated with the beam.

In an embodiment, in the modifying (S20) of the glass substrate GS, the glass material may be modified by irradiating at least a partial region of the second region CA of the glass substrate GS with the beam. In the second region CA, the partial region, of the second region CA, irradiated with the beam may include a curved surface region and a hole region. In an embodiment, the beam may be emitted from a laser LZ positioned above the glass substrate GS in a direction from a front surface to a rear surface of the glass substrate GS. In an embodiment, when the hole disposed in the glass substrate GS by the method for manufacturing an electronic device according to an embodiment is a cavity, a beam in an emission direction different from the emission direction of the beam may be additionally provided to the hole region. For example, to provide a cavity extending from a lower surface of the glass substrate GS, the hole region may be irradiated in a direction from the rear surface to the front surface of the glass substrate GS. In this case, the laser LZ may be positioned below the glass substrate GS. The curved surface region and the hole region modified by the beam may be etched better than a remaining region (for example, the first region FA). Such a modifying operation may make it possible to increase an etching selectivity of the modified region in a subsequent etching operation.

For example, the beam with which the glass substrate GS is irradiated may be a Bessel beam emitted from an ultra-short pulse laser. For example, the ultra-short pulse laser may be a picosecond laser or a femtosecond laser. Beam energy may exceed a limit value for modifying the glass substrate GS. A modification of the glass substrate GS may mean a change in refractive index, changes in material density, melting, compacting, and ablation, or a chemical change of a material. Further, the modification may include cracking a material to create microscopic fissures or voids that may facilitate infiltration of the etchant. Further, the modification may change a bond angle of silicon oxide ($SiO_2$) that constitutes the glass substrate GS. The curved surface region may be more deeply modified by the beam as getting closer to the edge of the glass substrate GS. That is, as the curved surface region is closer to the edge of the glass substrate GS, the depth of the region modified by the beam may become greater. In addition, the depth of the region modified by the beam may be greater in the hole region than in the curved surface region. For example, the hole region may be modified to a depth corresponding to a thickness of the glass substrate GS such that a through-hole is defined in the glass substrate GS.

Referring to FIGS. 8 and 9C, the method for manufacturing an electronic device according to an embodiment may include etching (S30). The etching (S30) may be performed after a region of the glass substrate GS is modified. In the etching (S30) according to an embodiment, the curved surface region and the hole region, which have been modified by the modifying operation (S20) of the glass substrate that has been performed previously may be etched more rapidly than a remaining unmodified region. A hole and a curved surface may be formed in the glass substrate GS through the etching. The curved surface formed in the curved surface region of the glass substrate GS may correspond to the curved surface WU-2 of the window WM described with reference to FIG. 4A, etc. In the curved surface region of the glass substrate GS that has undergone the etching, a thickness of the glass substrate GS may become smaller toward the edge of the glass substrate GS. The curved surface formed in the curved surface region may have a curvature which becomes greater toward the edge of the glass substrate GS. The hole formed in the hole region of the glass substrate GS may correspond to the hole formed in the window WM described with reference to FIG. 4A, etc. The hole formed in the glass substrate GS may include a through-hole and a cavity. For example, the through-hole defined in the glass substrate GS may correspond to the through-holes WH1, WH2, WH3 of FIG. 5B. A diameter of the through-hole defined in the glass substrate GS by the etching (S30) may become greater from the center of the through-hole toward a normal line direction of the window.

In the etching (S30) according to an embodiment, an etching process may be a wet etching process. For example, a dip process may be used in the etching (S30). Referring to FIG. 9C, in the etching (S30), the modified region of the glass substrate GS may be etched by dipping the glass substrate GS into an etchant ECH stored in a tank TN. When the dip process is used for the etching (S30), the glass substrate GS may be exposed to the etchant as a whole. Accordingly, in the glass substrate GS, not only the curved region and the hole region modified by the beam but also other regions may be etched. However, since the modifying operation (S20) increases an etching selectivity for the curved surface region and the hole region of the glass substrate GS, the window WM (see FIG. 4A) according to the embodiment described above may be obtained.

The method for manufacturing an electronic device according to an embodiment may include attaching a display module (S40). As described above, the glass substrate GS in which the curved surface and the hole are formed through the modifying operation (S20) and the etching operation (S30) may be provided as the window WM.

Referring back to FIG. 4A with FIG. 8 together, the display module DM may be attached to the window WM. The display module DM may be attached to the lower surface WB of the window WM. In an embodiment, the display module DM and the window WM may be attached to each other by the adhesive layer described above.

In an electronic device according to one or more embodiments of the inventive concept, hole visibility may decrease by fine holes formed in a curved surface of a window, and, thus, aesthetics in appearance may be improved. Further, in an electronic device according to one or more embodiments, as a display region increases due to a reduction of a bezel region, display quality may be improved.

Although some embodiments of the inventive concept have been described, it is to be understood that various changes and modifications can be made by one of ordinary skill in the art within the spirit and scope of the present invention as herein claimed.

Therefore, the technical scope of the inventive concept is not limited to the content described in the detailed description of the specification, but should be determined by the claims.

What is claimed is:

1. A method for manufacturing an electronic device, the method comprising:

providing a glass substrate including a first region, and a second region outside the first region and including an edge of the glass substrate;

modifying a region of the glass substrate by irradiating a partial region of the second region with a beam;

etching the modified region of the glass substrate to form a curved surface and a hole in the modified region of the glass substrate; and attaching a display module to the glass substrate, wherein, in the modifying the region of the glass substrate, the partial region includes a curved surface region in which the curved surface is to be formed and a hole region in which the hole is to be formed, in the curved region, a depth of a region modified by the beam increases toward the edge of the glass substrate, and in the hole region, a depth of a region modified by the beam is greater than that of the curved region.

2. The method of claim 1, wherein, in the etching, the modified region has a higher etch selectivity than a remaining region that is not modified.

3. The method of claim 1, wherein, after the etching, in the curved region, a thickness of the glass substrate becomes thinner in a direction toward the edge and a curvature of the curved surface increases in the direction toward the edge.

4. The method of claim 1, wherein, in the modifying of the glass substrate, in the hole region, the hole is modified to a depth corresponding to a thickness of the glass substrate such that the hole penetrates the glass substrate.

5. The method of claim 4, wherein a through-hole formed in the hole region by the etching has a diameter that increases from a center of the through-hole toward a normal line direction of the glass substrate.

6. The method of claim 1, wherein the beam is a Bessel beam emitted from an ultra-short pulse laser.

*    *    *    *    *